United States Patent
Suzuki et al.

(10) Patent No.: US 11,410,327 B2
(45) Date of Patent: Aug. 9, 2022

(54) LOCATION DETERMINATION APPARATUS, LOCATION DETERMINATION METHOD AND COMPUTER PROGRAM

(71) Applicant: NIPPON TELEGRAPH AND TELEPHONE CORPORATION, Tokyo (JP)

(72) Inventors: Satoshi Suzuki, Musashino (JP); Takehito Miyazawa, Musashino (JP); Motohiro Takagi, Musashino (JP); Kazuya Hayase, Musashino (JP); Tokinobu Mitasaki, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 167 days.

(21) Appl. No.: 16/976,487

(22) PCT Filed: Feb. 21, 2019

(86) PCT No.: PCT/JP2019/006512
§ 371 (c)(1),
(2) Date: Aug. 28, 2020

(87) PCT Pub. No.: WO2019/167784
PCT Pub. Date: Sep. 6, 2019

(65) Prior Publication Data
US 2020/0410709 A1 Dec. 31, 2020

(30) Foreign Application Priority Data
Mar. 2, 2018 (JP) .............................. JP2018-038042

(51) Int. Cl.
G06K 9/00 (2022.01)
G06T 7/70 (2017.01)
G06N 3/08 (2006.01)

(52) U.S. Cl.
CPC .............. *G06T 7/70* (2017.01); *G06N 3/084* (2013.01); *G06T 2207/20081* (2013.01); *G06T 2207/20084* (2013.01)

(58) Field of Classification Search
CPC ..... G06V 10/82; G06K 9/6232; G06K 9/6256
See application file for complete search history.

(56) References Cited

U.S. PATENT DOCUMENTS 10,769,411 B2 * 9/2020 Grabner .................... G06T 7/75
10,860,870 B2 * 12/2020 Noda ................ B60W 30/0956
(Continued)

OTHER PUBLICATIONS

W. Shimoda, K. Yanai, "Distinct Class-specific Saliency Maps for Weakly Supervised Semantic Segmentation." Sep. 17, 2016.
(Continued)

*Primary Examiner* — Hadi Akhavannik

(57) ABSTRACT

A position determination apparatus for determining, from a first image that is an image including at least a desired first subject, a position of the desired first subject, includes: a feature amount acquisition unit that acquires a first feature amount representing a predetermined feature of the first image; an estimation unit in which a second feature amount representing the predetermined feature obtained from a second image including a second subject is associated with a selected feature map that is a feature map corresponding to the second subject among a plurality of feature maps that are a set of feature maps that are maps representing features of the second image; an estimated first feature map that is estimated by the estimation unit to be associated with the first feature amount: and a position determination unit that
(Continued)

determines the position of the desired first subject using the estimated first feature map.

6 Claims, 8 Drawing Sheets

(56) References Cited

U.S. PATENT DOCUMENTS

| | | | | |
|---|---|---|---|---|
| 2010/0189313 | A1* | 7/2010 | Prokoski | A61B 5/411 |
| | | | | 382/118 |
| 2016/0086058 | A1* | 3/2016 | Mitarai | G06V 30/194 |
| | | | | 382/159 |
| 2016/0086078 | A1* | 3/2016 | Ji | G06N 3/084 |
| | | | | 382/157 |
| 2017/0293815 | A1* | 10/2017 | Cosatto | G06V 10/40 |
| 2017/0293837 | A1* | 10/2017 | Cosatto | G06V 20/58 |
| 2018/0032801 | A1* | 2/2018 | Gur | G06N 3/08 |
| 2018/0165548 | A1* | 6/2018 | Wang | G06N 3/084 |
| 2020/0410709 | A1* | 12/2020 | Suzuki | G06T 7/70 |

OTHER PUBLICATIONS

F. Yu, V. Koltun, T. Funkuhouser, "Dilated Residual Networks." May 28, 2017.

* cited by examiner

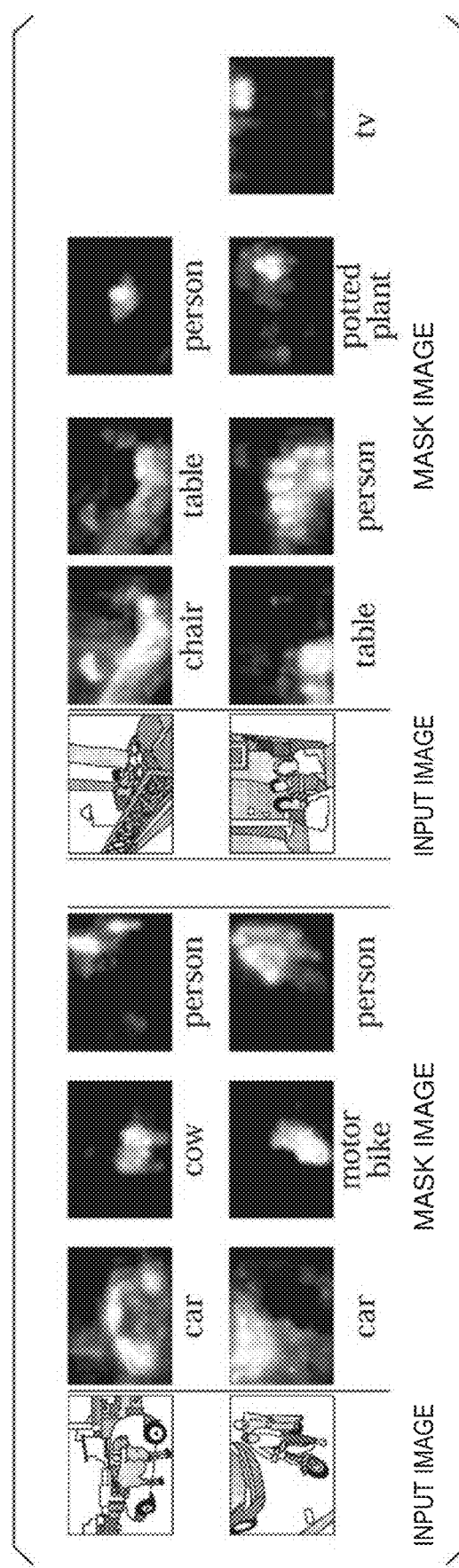

LOCATION DETERMINATION APPARATUS, LOCATION DETERMINATION METHOD AND COMPUTER PROGRAM

CROSS-REFERENCE TO RELATED APPLICATIONS

This application is a 371 U.S. National Phase of International Application No. PCT/JP2019/006512, filed on Feb. 21, 2019, which claims priority to Japanese Application No. 2018-038042, filed on Mar. 2, 2018. The entire disclosures of the above applications are incorporated herein by reference.

TECHNICAL FIELD

The present invention relates to a position determination apparatus, a position determination method, and a computer program.

BACKGROUND ART

In recent years, there have been proposed many techniques for determining the position of a subject in an image using statistical machine learning. Position determination techniques are expected to be applied to various industries such as automatic driving of a car. As an approach by which a position determination apparatus determines the position of an object from an image, two approaches called object detection and area segmentation are known. Object detection is an approach for presenting a rectangular area including a target subject. Area segmentation is an approach for presenting information indicating to which object in an image a subject belongs for each pixel.

Among area segmentation approaches, an approach for giving only correct answer data indicating the type of an object present in an image is called weakly supervised area segmentation. Data given the correct answer data will be referred to as weakly supervised data. As weakly supervised data, a large amount of data can be easily collected. Since weakly supervised data has high affinity for big data, many approaches have been proposed.

In weakly supervised area segmentation, there has been known an approach for removing a background portion of an image using a mask image indicating a rough position of an object in the image as in Non-Patent Literature 1. FIG. 9 is a diagram showing an example of an image in which the background of an object in the image has been removed. It is known that in weakly supervised area segmentation, a highly accurate mask image for a target image is generated by using a kind of deep learning approach called DRN (dilated residual network) as in Non-Patent Literature 2.

CITATION LIST

Non-Patent Literature

Non-Patent Literature 1: W. Shimoda, K. Yanai, "Distinct Class-specific Saliency Maps for Weakly Supervised Semantic Segmentation", 2016
Non-Patent Literature 2: F. Yu, V. Koltun, T. Funkuhouser, "Dilated Residual Networks", 2017

SUMMARY OF THE INVENTION

Technical Problem

An area segmentation approach using deep learning such as DRN shows high accuracy. However, in the case of learning data in which a subject whose position is to be determined and a background are simultaneously captured, it is difficult to generate a highly accurate mask image. For example, when capturing images outdoors, a drone having a camera installed in the downward direction captures a group of images including the ground. In the captured group of images, an object other than the ground and the ground are included in a set in the image. Therefore, in weakly supervised area segmentation, it is difficult to perform area segmentation on the above-described image or the like only by simply performing input and propagation to DRN and using the output layer. On the other hand, an approach is conceivable which uses an output value of an intermediate layer as a mask image instead of the mask image of the output layer.

However, an output value of the intermediate layer is not explicitly given information about for what kind of characteristic of the input image a mask image is generated. Therefore, the position determination apparatus needs to estimate what kind of mask image is generated for an output value of the intermediate layer. In some cases, no mask image is generated for a desired subject. For example, in the input image, when desired subjects are present on the left and right sides of the input image without being continuous, there may be a case where two mask images are generated based on output values of the intermediate layer, in which a mask image reacting to the object on the left side in the image and an image reacting to the object on the right side in the image are obtained. When such mask images are obtained, the position determination apparatus must combine a plurality of mask images to generate a new mask image and determine the position of the subject.

In view of the above circumstances, an object of the present invention is to provide a technique for determining the position of a subject in an image with higher accuracy.

Means for Solving the Problem

An aspect of the present invention is a position determination apparatus for determining, from a first image that is an image including at least a desired first subject, a position of the desired first subject, including: a feature amount acquisition unit that acquires a first feature amount representing a predetermined feature of the first image; an estimation unit in which a second feature amount representing the predetermined feature obtained from a second image including a second subject is associated with a selected feature map that is a feature map corresponding to the second subject among a plurality of feature maps that are a set of feature maps that are maps representing features of the second image; an estimated first feature map that is estimated by the estimation unit to be associated with the first feature amount: and a position determination unit that determines the position of the desired first subject using the estimated first feature map.

Effects of the Invention

The present invention makes it possible to determine the position of a subject in an image with higher accuracy.

BRIEF DESCRIPTION OF DRAWINGS

FIG. 9 is a diagram showing an example of an image in which the background of an object in the image is removed.

DETAILED DESCRIPTION OF THE INVENTION

First Embodiment

Figure 1:
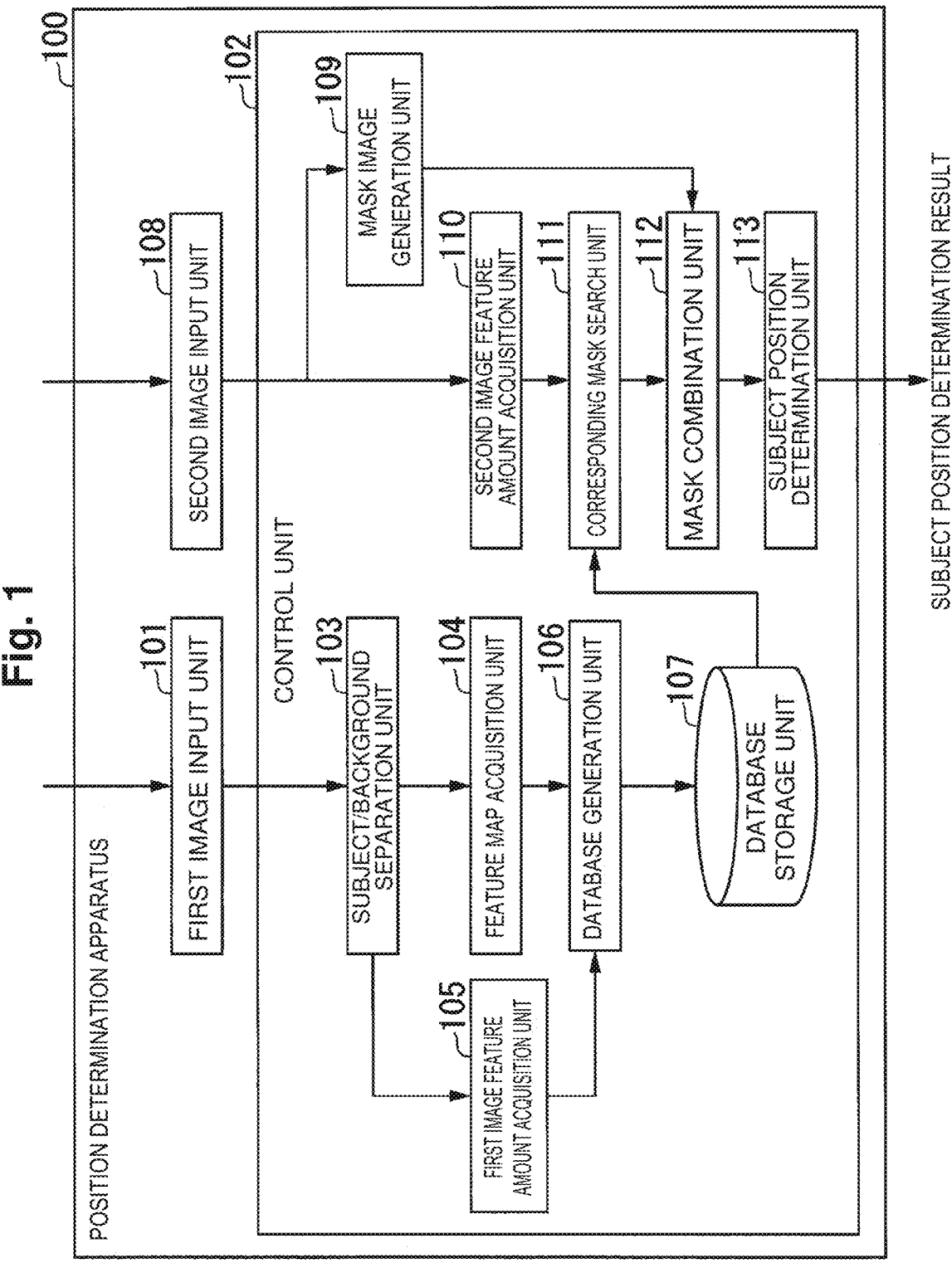
FIG. 1 is functional block diagram showing an example of a functional configuration of a position determination apparatus in a first embodiment.

FIG. 1 is a functional block diagram showing an example of a functional configuration of a position determination apparatus in a first embodiment. In an image in which a subject and a background are captured together, a position determination apparatus 100 detects the area of the subject included in the image. The position determination apparatus 100 determines, for example, the area of a subject included in an image that is aerially photographed by a flying body such as a drone.

The position determination apparatus 100 is provided with a processor such as a CPU (central processing unit), a memory, and an auxiliary storage apparatus that are connected via a bus, and executes a position determination program to function as an apparatus provided with a first image input unit 101, a control unit 102, a subject/background separation unit 103, a feature map acquisition unit 104, a first image feature amount acquisition unit 105, a database generation unit 106, a database storage unit 107, a second image input unit 108, a mask image generation unit 109, a second image feature amount acquisition unit 110, a corresponding mask search unit 111, a mask combination unit 112, and a subject position determination unit 113. Note that all or a part of each function of the position determination apparatus 100 may be implemented using hardware such as an ASIC (application specific integrated circuit), a PLD (programmable logic device), and an FPGA (field programmable gate array). The position determination program may be recorded on a computer-readable recording medium. The computer readable recording medium is, for example, a portable medium such as a flexible disk, a magneto-optical disk, a ROM, and a CD-ROM, or a storage apparatus such as a hard disk built in a computer system. The position determination program may be transmitted via a telecommunication line.

The first image input unit 101 is configured using an input apparatus such as a touch panel, a mouse, and a keyboard. The first image input unit 101 may be an interface for connecting the input apparatus to the position determination apparatus 100. In this case, the first image input unit 101 generates input data (e.g., instruction information indicating an instruction for the position determination apparatus 100) from an input signal input in the input apparatus, and inputs the input data to the position determination apparatus 100. Note that the second image input unit 108 is configured similarly.

The first image input unit 101 receives an image including a subject and a background. The image received by the first image input unit 101 is used for generating a database described later. The first image input unit 101 outputs the received image to the subject/background separation unit 103.

The control unit 102 controls the operation of each unit of the position determination apparatus 100. The control unit 102 is executed by an apparatus provided with a processor such as a CPU and a RAM (random access memory), for example. The control unit 102 executes the position determination program to function as the subject/background separation unit 103, the feature map acquisition unit 104, the first image feature amount acquisition unit 105, the database generation unit 106, the database storage unit 107, the second image input unit 108, the mask image generation unit 109, the second image feature amount acquisition unit 110, the corresponding mask search unit 111, the mask combination unit 112, and the subject position determination unit 113.

The subject/background separation unit 103 generates an image in which the subject and the background are separated from the received image including the subject and the background. The subject/background separation unit 103 generates at least two images in which the subject and the background are separated. The subject/background separation unit 103 generates an image of only the subject by blacking out the image indicating the background of the separated image. The subject/background separation unit 103 may generate an image in which the subject and the background are separated using any method. A part of the background may remain in the separated image, or noise such as a missing part of the subject may be included therein. In short, in the image of only the subject, it is sufficient that the subject occupies most of the image area. Although "most" varies depending on the properties of the subject and the background, it is preferably 70% or more. If accuracy is not considered, it is sufficient that even one pixel of the foreground is included. The subject/background separation unit 103 outputs the generated image of only the subject to the feature map acquisition unit 104 and the first image feature amount acquisition unit 105.

The feature map acquisition unit 104 propagates the image of only the subject to a learned DRN described later. DRN is an approach of CNN. CNN (convolution neural network) is an approach of deep learning. CNN is an approach of repeating a convolution process on an input image to obtain an output value. The input image of only the subject will be referred to as a subject image. An output value of the convolution process will be referred to as a feature map. That is, when the feature map acquisition unit 104 inputs and propagates the subject image to DRN, there are as many feature maps as the number of convolution processes. The feature map acquisition unit 104 acquires an output value of an intermediate layer of DRN obtained as a result of inputting and propagating the subject image to DRN, that is, a feature map. The feature map acquisition unit 104 outputs the feature map. Here, the feature map is described again. The feature map is, for example, an output value of a predetermined intermediate layer of a feature model (e.g., the above-mentioned learned DRN). That is, the feature map is an output value obtained by performing an arithmetic operation related to the predetermined intermediate layer on a subject image or on an output value obtained by propagating the subject image through at least one intermediate layer different from the predetermined intermediate layer. The feature map may be restated as an output value of a filter that performs the arithmetic operation related to the predetermined intermediate layer. The feature map acquisition unit 104 inputs and propagates the subject image to DRN to obtain one or more feature maps. The feature maps are generated from the image input to DRN such as a target image, or from a result obtained by performing a convolution process on the image input to DRN such as the target image and further performing a convolution process on the resultant feature map.

Although this embodiment is described taking DRN as an example of a feature model, it is not limited to DRN as long as it is a neural network that performs in an intermediate layer a process of extracting a feature of an image or each predetermined area in the image through convolution of input data.

Note that DRN used in feature map acquisition unit 104 has already been learned using a natural image data set. Although the natural image data set is, for example, images including nature such as the sea, a mountain, a river, a forest, or the sky, it may be a group of images in which any kind of object is captured. The group of images in which any kind of object is captured may be, for example, images obtained by installing a camera at a place where a desired subject to be extracted may be present and continuously capturing for a predetermined period of time. The natural image data set only needs to have as many images as can be clustered. For example, when not considering the accuracy related to the probability of which category an image is classified into, the natural image data set may be a single image.

Figure 2:
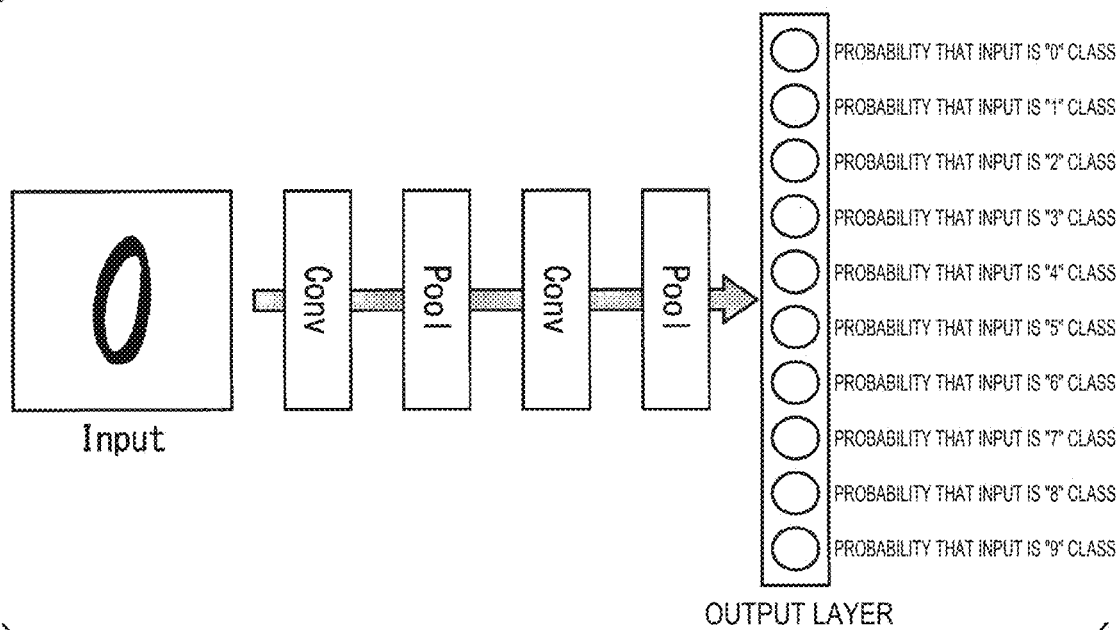
FIG. 2 is a diagram showing an example of an identification result of CNN in handwritten digit recognition.

FIG. 2 is a diagram showing an example of an identification result of CNN in handwritten digit recognition. CNN calculates for an input image a probability of which category the image is classified into. In CNN, when the category with the highest probability in the output layer is output, it is the identification result of CNN. DRN is learned so as to minimize the difference between a vector obtained in the output layer (in the example of FIG. 2, a vector having 10 elements) and a correct answer vector (in the example of FIG. 2, a vector in which the element indicating the probability of the "0" class is 1 and the other elements are 0). Specifically, it is learned by minimizing an objective function called a SoftMax loss. In learning, the objective function is minimized by the stochastic gradient descent method (the SGD method) based on gradient information calculated by the error back-propagation method (the BP method). Note that CNN may be any model as long as it is learned with natural image data or the like, so it is not limited to DRN.

Returning to FIG. 1, the description of the position determination apparatus 100 will be continued. The feature map acquisition unit 104 acquires a feature map suitable for a desired subject from the output values of the intermediate layer, that is, a plurality of feature maps obtained as a result of inputting and propagating the subject image to DRN as described in paragraph 0017. The term "suitable" means strongly reacting to an area corresponding to the desired subject, in other words, being effective for use in generation of a mask for extracting the desired subject. The feature map acquisition unit 104 may acquire a feature map in which a neuron exhibiting the maximum value is present, or may acquire a feature map by a user visually confirming whether it is a feature map having reacted to the subject. Information indicating what number feature map in DRN the acquired feature map is will be referred to as an "index". That is, an index is information indicating a position in the intermediate layer from which a feature map can be acquired. The feature map acquisition unit 104 acquires the index corresponding to the acquired feature map. The feature map acquisition unit 104 outputs the acquired index to the database generation unit 106. The feature map is expected to react to any of several arbitrary feature representations included in the image. Note that this embodiment uses the acquired feature map suitable for the desired subject under the assumption that it reacts to even a desired subject different from the desired subject. In other words, this is based on the assumption that when the desired subject is a solar panel and if a feature map reacting to the solar panel can be obtained, an obtained feature map reacts to the solar panel even in a different image in which the solar panel is captured so as to have a property similar to that of the image from which the feature map is obtained. The property similar to that of the image is intended to be a feature in which a selected feature amount is reflected. For example, when a luminance value is selected, it is a property in which the luminance value is reflected, and when a code amount is selected, it is a property in which the pattern of the subject is reflected.

Figure 3:
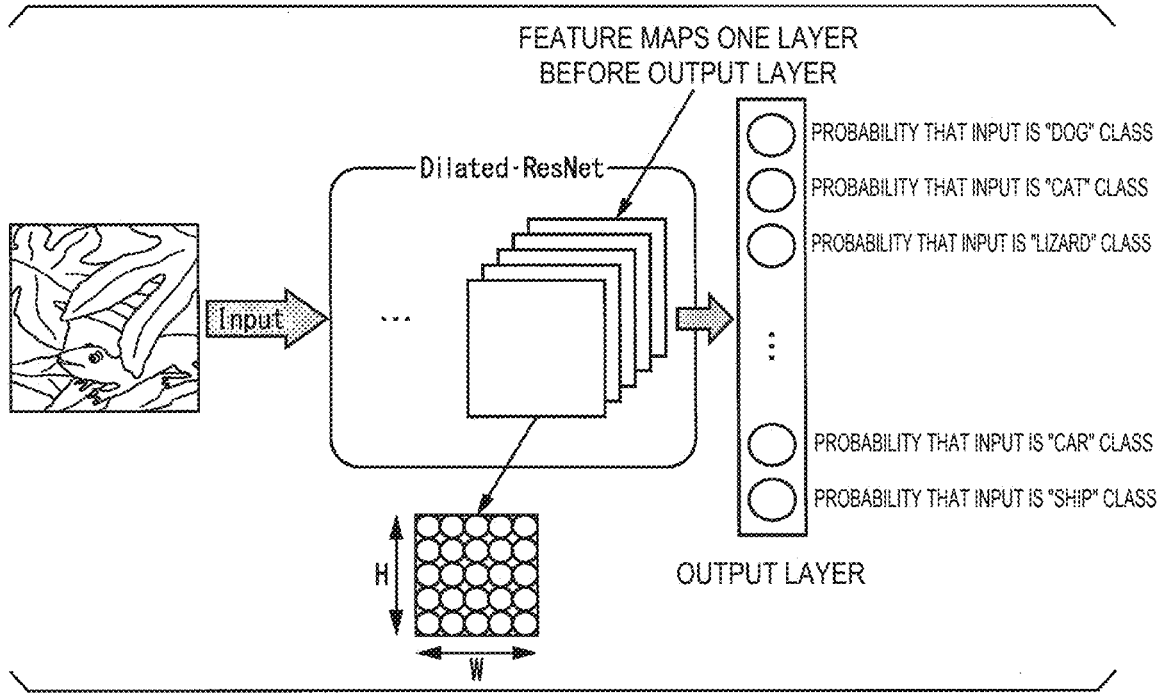
FIG. 3 is a diagram showing an example of a feature map in which neurons are visualized.

Here, a method of acquiring a feature map in which a neuron exhibiting the maximum value is present will be described. FIG. 3 is a diagram showing an example of a feature map in which neurons are visualized. The feature map acquisition unit 104 acquires a plurality of feature maps as output values of the intermediate layer of DRN. Each feature map has as many neurons as correspond to a height (H) and a width (W) like an image. A neuron outputs a numerical value for the input image. In a specific intermediate layer (one layer before the output layer in FIG. 3), there are a total of H×W×(the number of feature maps) neurons. The feature map acquisition unit 104 generates an H×W×(the number of feature maps) array by inputting the image of only the subject. The values output by the neurons are held in the array.

The feature map acquisition unit 104 executes a process of determining the position of the maximum value for the generated array. The maximum value is a value that is the maximum among the elements of the array. The position of the maximum value is information identifying an element of the array holding the maximum value. As the process of determining the position of the maximum value, a well-known approach such as brute force may be used. With such a process, the feature map acquisition unit 104 can acquire a feature map in which a neuron exhibiting the maximum value is present. Note that the feature map acquisition unit 104 may calculate an average value of values output to the neurons for each feature map, and acquire a feature map that maximizes the average value. In addition, the feature map acquisition unit 104 may acquire the feature map by any method such as determining from the overlap ratio between the area showing a reaction to the subject and the area masked in the input.

Returning to FIG. 1, the description of the position determination apparatus 100 will be continued. The first image feature amount acquisition unit 105 acquires from a subject image a luminance feature amount of the image. The luminance feature amount in this embodiment is a luminance value. Note that the first image feature amount acquisition unit 105 may acquire an image feature amount calculated based on gradient information or a feature amount acquired from an intermediate layer of CNN instead of the luminance feature amount. The luminance feature amount acquired by the first image feature amount acquisition unit 105 may be another feature amount as long as it has a property capable of characterizing the desired subject. In addition, the luminance feature amount may be a feature amount having a correlation with a feature amount that can be identified as being used in DRN or CNN. The first image feature amount acquisition unit 105 outputs the acquired luminance feature amount of the image to the database generation unit 106.

The database generation unit 106 associates the acquired luminance feature amount and index with each other on a one-to-one basis to generate a feature amount/index database. The database generation unit 106 records the generated feature amount/index database in the database storage unit 107.

In other words, it can be said that the luminance feature amount acquired by the first image feature amount acquisition unit 105 is associated with the feature map determined by the feature map acquisition unit 104 to be suitable for the desired subject.

The database storage unit 107 is configured using a storage apparatus such as a magnetic hard disk apparatus and a semiconductor storage apparatus. The database storage unit 107 stores the feature amount/index database.

The second image input unit 108 receives a target image that is an image from which the position of the subject is to be acquired. The second image input unit 108 outputs the received target image to the mask image generation unit 109 and the second image feature amount acquisition unit 110.

The mask image generation unit 109 inputs and propagates the target image to DRN to acquire a plurality of feature maps. Since this process is the same as that of the feature map acquisition unit 104, the description is omitted. The mask image generation unit 109 uses the same learned DRN as that of the feature map acquisition unit 104. The mask image generation unit 109 may use a different DRN, but in that case it is necessary to use some approach to associate indexes between DRNs with each other such as an index corresponding to a feature map of DRN used in the feature map acquisition unit 104 and an index corresponding to a feature map of DRN used in the mask image generation unit 109. The mask image generation unit 109 inputs and propagates the target image to DRN to acquire an output value of the intermediate layer of DRN, that is, a feature map. The mask image generation unit 109 outputs the acquired output value of the intermediate layer to the mask combination unit 112.

The second image feature amount acquisition unit 110 acquires a luminance feature amount from the target image. It is sufficient that the luminance feature amount acquired here is acquired by the same means as that of the first image feature amount acquisition unit 105. In this embodiment, the description is continued assuming that the luminance feature amount is a luminance value.

The corresponding mask search unit 111 acquires an index from the feature amount/index database based on the luminance feature amount acquired by the second image feature amount acquisition unit 110. For example, the corresponding mask search unit 111 identifies the value of a luminance feature amount that is closest to the luminance feature amount acquired by the second image feature amount acquisition unit 110 and the value of a luminance feature amount recorded in the feature amount/index database. The corresponding mask search unit 111 acquires an index associated with the identified luminance feature amount on a one-to-one basis. The corresponding mask search unit 111 may set a representative index in advance using a clustering algorithm, and use a cluster center that is closest in distance. The corresponding mask search unit 111 acquires a feature map suitable for generation of a mask image from an output value of the intermediate layer of DRN based on the acquired index.

As the index, it is possible to use an index corresponding to a luminance feature amount stored in the feature amount/index database that is closest to the luminance feature amount acquired in the second image feature amount acquisition unit 110 as described above, or it is possible to use indexes corresponding to luminance feature amounts stored in the feature amount/index database whose differences between the luminance feature amount acquired in the second image feature amount acquisition unit 110 and the luminance feature amounts stored in the feature amount/index database are equal to or less than a predetermined threshold, that is, a plurality of indexes.

The process in the corresponding mask search unit 111 may be restated as estimation of a feature map that is estimated to react to the desired subject from among feature maps obtained by inputting and propagating the target image to DRN based on association between luminance feature amounts and feature maps described in the database generation unit 106.

When generating a mask image from a plurality of feature maps, the corresponding mask search unit 111 calculates weights for a weighted sum using the feature amount/index database. The corresponding mask search unit 111 generates a mask image based on the calculated weights. For example, the corresponding mask search unit 111 may calculate the weights by using the distances or the like in the order of closeness of the values of the luminance feature amounts. The corresponding mask search unit 111 may calculate the weights using another well-known approach. Note that the corresponding mask search unit 111 may be configured to generate a mask image by acquiring, modeling, and associating a probability distribution recorded in the feature amount/index database.

The mask combination unit 112 generates as a mask image a feature map corresponding to the acquired index among feature maps obtained by the mask image generation unit 109. When using a plurality of indexes, the mask combination unit 112 may generate a mask image based on the weights for the indexes. A weighted sum, a logical operation, weighting by machine learning as described later, or the like is used for weighting. The mask combination unit 112 generates a combined mask image indicating the position of the subject to be applied to the target image.

The subject position determination unit 113 generates position information in which the position of the subject is determined based on the generated combined mask image. The subject position determination unit 113 outputs the position information as a subject position determination result. The subject position determination unit 113 is an aspect of the position determination unit. The position determination unit determines the position of the subject based on the generated mask image.

Figure 4:
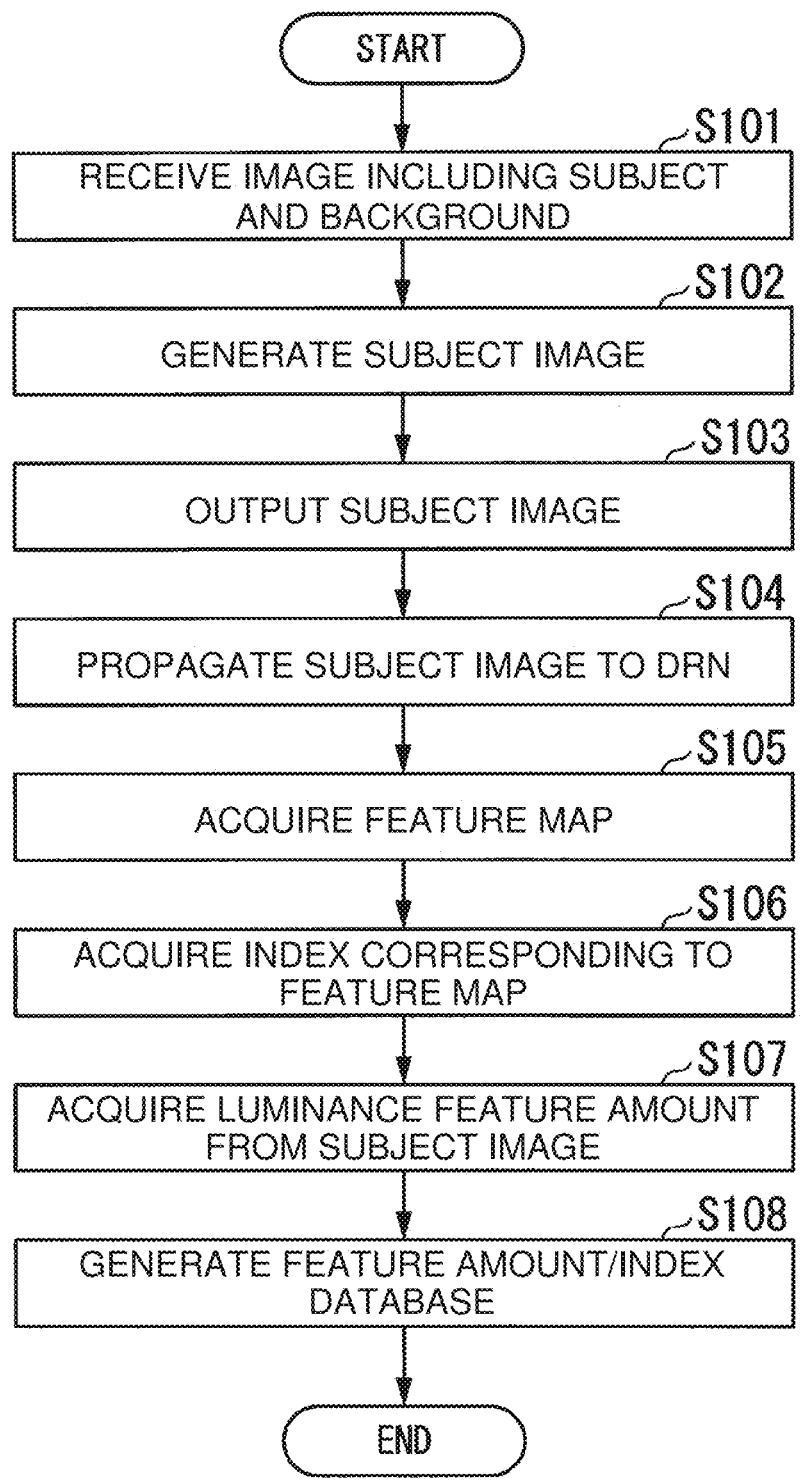
FIG. 4 is a flowchart showing the flow of a process for generating a feature amount/index database in the first embodiment.

FIG. 4 is a flowchart showing the flow of a process for generating the feature amount/index database in the first embodiment. The first image input unit 101 receives an image including a subject and a background (step S101). The subject/background separation unit 103 generates a subject image, which is an image of only the subject and in which the subject and the background are separated, from the received image including the subject and the background (step S102). The subject/background separation unit 103 outputs the generated subject image to the feature map acquisition unit 104 and the first image feature amount acquisition unit 105 (step S103).

The feature map acquisition unit 104 inputs and propagates the subject image to the learned DRN (step S104). The feature map acquisition unit 104 acquires a feature map suitable for a mask (step S105). The feature map acquisition unit 104 acquires an index corresponding to the acquired feature map (step S106). In regard to acquisition of the feature map suitable for the mask and acquisition of the index corresponding to the feature map, the above description of the feature map acquisition unit 104 should be referred to.

The first image feature amount acquisition unit 105 acquires a luminance feature amount from the subject image (step S107). The database generation unit 106 associates the acquired luminance feature amount and index with each other on a one-to-one basis to generate the feature amount/index database (step S108).

Figure 5:
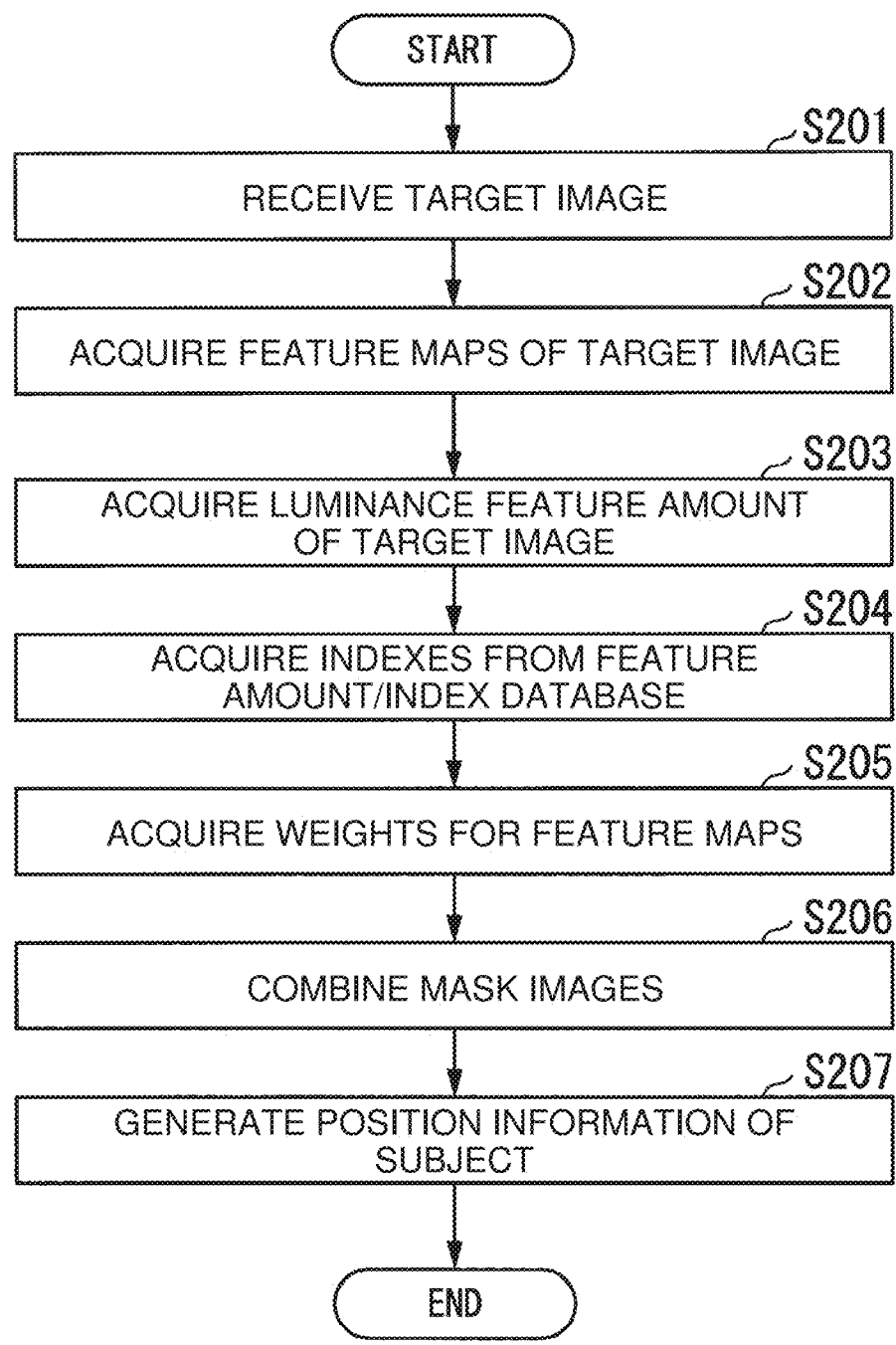
FIG. 5 is a flowchart showing the flow of a process for determining the position of a subject in the first embodiment.

FIG. 5 is a flowchart showing the flow of a process for determining the position of the subject in the first embodiment. The second image input unit 108 receives a target image that is an image from which the position of the subject is to be acquired (step S201). The mask image generation unit 109 inputs and propagates the target image to the learned DRN to acquire feature maps (step S202). Based on the target image, the second image feature amount acquisition unit 110 acquires a luminance feature amount of the image (step S203).

The corresponding mask search unit 111 acquires an index from the feature amount/index database based on the acquired luminance feature amount (step S204). When using a plurality of indexes, the corresponding mask search unit 111 acquires a weight for a feature map corresponding to each index (step S205). The mask combination unit 112 generates a combined mask image based on the feature maps corresponding to the acquired indexes of the intermediate layer and the obtained weights (step S206). The subject position determination unit 113 generates position information in which the position of the subject is determined based on the generated combined mask image (step S207).

The thus-configured position determination apparatus 100 determines the position of the desired subject from the target image by using the feature amount/index database obtained by associating the index of a feature map suitable for the desired subject obtained from the subject image and the learned DRN with the luminance feature amount of the subject image. That is, this enables extraction of the desired subject.

To describe the points of this embodiment:
1. a subject image is input and propagated to a learned DRN to obtain a plurality of feature maps that are outputs of an intermediate layer;
2. a feature map suitable for a desired subject is acquired from among the obtained feature maps;
3. a predetermined feature amount is extracted from the subject image;
4. the extracted feature amount is associated with an index corresponding to the feature map suitable for the desired subject;
5. a target image is input and propagated to the same learned DRN as in 1. to acquire a plurality of feature maps;
6. a feature amount is extracted from the target image using the same approach as in 3;
7. an index is acquired that corresponds to a feature amount associated in 4. that is close to the feature amount extracted in 6;
8. a feature map corresponding to the index obtained in 7. is acquired from among the feature maps obtained in 5; and
9. the feature map obtained in 8. is applied to the target image as a mask to acquire the position of the desired subject.

Since a feature map that is an output of an intermediate layer of a learned neural network that is originally a black box is used as a mask, this is a configuration for associating a feature amount as a key, as described in 3. and 6.

Second Embodiment

Next, a position determination apparatus 100a in a second embodiment will be described. The position determination apparatus 100 in the first embodiment generates a combined mask image from a plurality of feature maps using a predetermined feature amount such as a luminance feature amount. The first embodiment is an approach that is particularly effective when a difference value between luminance values is remarkable between the inside of a subject whose position is to be determined and the outside of the subject whose position is to be determined such as a background (hereinafter referred to as "background or the like"), but in other cases, sufficient accuracy may not be obtained. Therefore, the position determination apparatus 100a in the second embodiment determines weights by machine learning when the difference value between the luminance values of the subject and the background or the like is not sufficiently large. In other words, this embodiment provides an approach that is particularly effective when an area is large where the distribution of the feature amounts of the subject overlaps the distribution of the feature amounts of the background or the like. The point of this embodiment is to perform learning so that among feature maps obtained when a learning image is input and propagated to DRN, a large weight is set for a feature map that strongly reacts to a subject, and a small weight is set for a feature map that strongly reacts to something other than the subject. "Strongly react" is the same as in the feature map acquisition unit 104.

Figure 6:
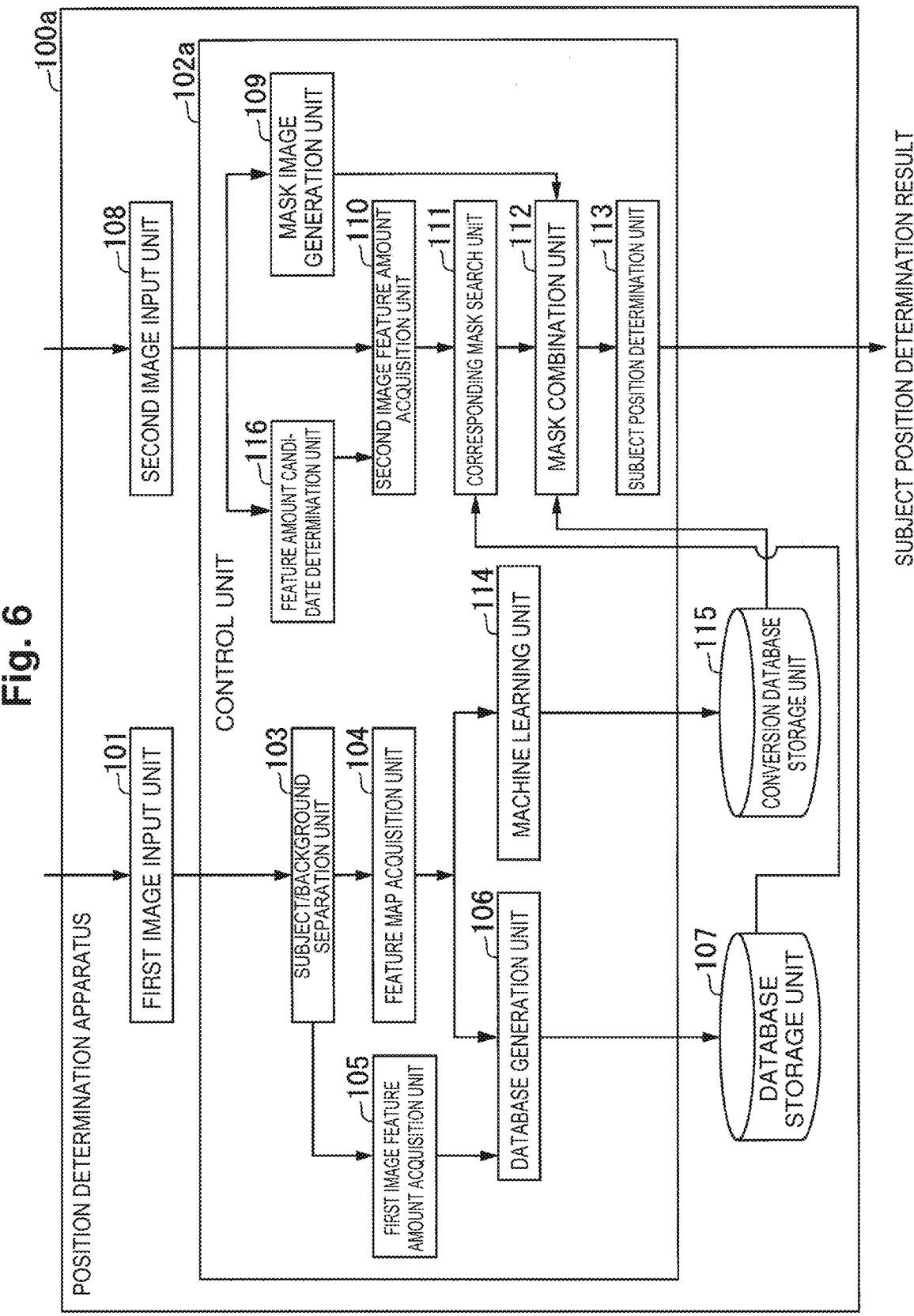
FIG. 6 is a functional block diagram representing a functional configuration of a position determination apparatus in a second embodiment.

FIG. 6 is a functional block diagram representing a functional configuration of the position determination apparatus in the second embodiment. The position determination apparatus 100a in the second embodiment is different from the first embodiment in that a control unit 102a is provided instead of the control unit 102, and a mask combination unit 112a is provided instead of the mask combination unit 112, and in that a machine learning unit 114, a conversion database storage unit 115, and a feature amount candidate determination unit 116 are further provided, but the other configurations are the same. Hereinafter, different points from the first embodiment will be described.

The control unit 102a controls the operation of each unit of the position determination apparatus 100a. The control unit 102a is executed by an apparatus provided with a processor such as a CPU and a RAM, for example. The control unit 102a executes a position determination program to function as the subject/background separation unit 103, the feature map acquisition unit 104, the first image feature amount acquisition unit 105, the database generation unit 106, the database storage unit 107, the second image input unit 108, the mask image generation unit 109, the second image feature amount acquisition unit 110, the corresponding mask search unit 111, the mask combination unit 112a, the subject position determination unit 113, and the machine learning unit 114.

The machine learning unit 114 receives a subject image from the subject/background separation unit 103. The machine learning unit 114 receives a feature map from the feature map acquisition unit 104. The machine learning unit 114 determines, by learning, conversion data of the feature map into a highly accurate mask image based on the subject image and the feature map. The conversion data is data for converting a mask image determined based on the position of the subject in the image and an output value of an intermediate layer of the image. The machine learning unit 114 uses, for example, correct answer data indicating the position of the subject as position information of the subject. The machine learning unit 114 may perform learning so that, for example, the feature map matches the position information of the subject, may perform learning so that, for example, any feature map matches the position information of the subject, or may learn a weight for each feature map and perform learning so that their linear sum matches the position information. Further, the machine learning unit 114 may use non-linear conversion for the output values of the intermediate layer instead of a linear process such as calculation of a simple weighted sum. The same effect can be obtained even with non-linear conversion. The machine learning unit 114 records the conversion data generated by learning in the conversion database storage unit 115 as a conversion database. The image of only the subject is an aspect of the learning image. The learning image is an image different from the target image in which the desired subject is captured, and is an image including the subject.

The conversion database storage unit 115 is configured using a storage apparatus such as a magnetic hard disk apparatus or a semiconductor storage apparatus. The conversion database storage unit 115 stores the conversion database.

The feature amount candidate determination unit 116 receives an image from which the position of the subject is to be acquired. The feature amount candidate determination unit 116 determines which of the luminance feature amount and the conversion data is used to generate a combined mask image based on the received image. Specifically, the feature amount candidate determination unit 116 acquires a difference value between luminance values in the image. When the difference value between the luminance values is equal to or larger than a threshold, the feature amount candidate determination unit 116 determines to use the value of the luminance feature amount as in the first embodiment. On the other hand, when the difference value between the luminance values is less than the threshold, the feature amount candidate determination unit 116 determines to use the conversion data. Note that as the threshold, the user visually selects one or more images with less change in luminance value. The feature amount candidate determination unit 116 may use a change in luminance value in the subject of the selected images as the threshold. The feature amount candidate determination unit 116 may also determine the threshold using another approach such as using the histogram of the luminance values to determine whether it is a unimodal distribution or not.

The mask combination unit 112a combines mask images according to the determination result of the feature amount candidate determination unit 116. When the feature amount candidate determination unit 116 determines to use the value of the luminance feature amount, the mask combination unit 112a performs the same process as in the first embodiment, so the description is omitted.

When the feature amount candidate determination unit 116 determines to use the conversion data, the mask combination unit 112a acquires the conversion database generated in advance by learning from the conversion database storage unit 115. The mask combination unit 112a converts the mask image received from the mask image generation unit 109 based on the conversion data to generate a combined mask image. The mask combination unit 112a is an aspect of the mask conversion unit. The mask conversion unit associates the position of a subject in a learning image with conversion data for converting a mask image determined based on an output value of an intermediate layer of the learning image. The mask conversion unit converts the mask image into a combined mask image representing the position of the subject by associating it with the conversion data.

Figure 7:
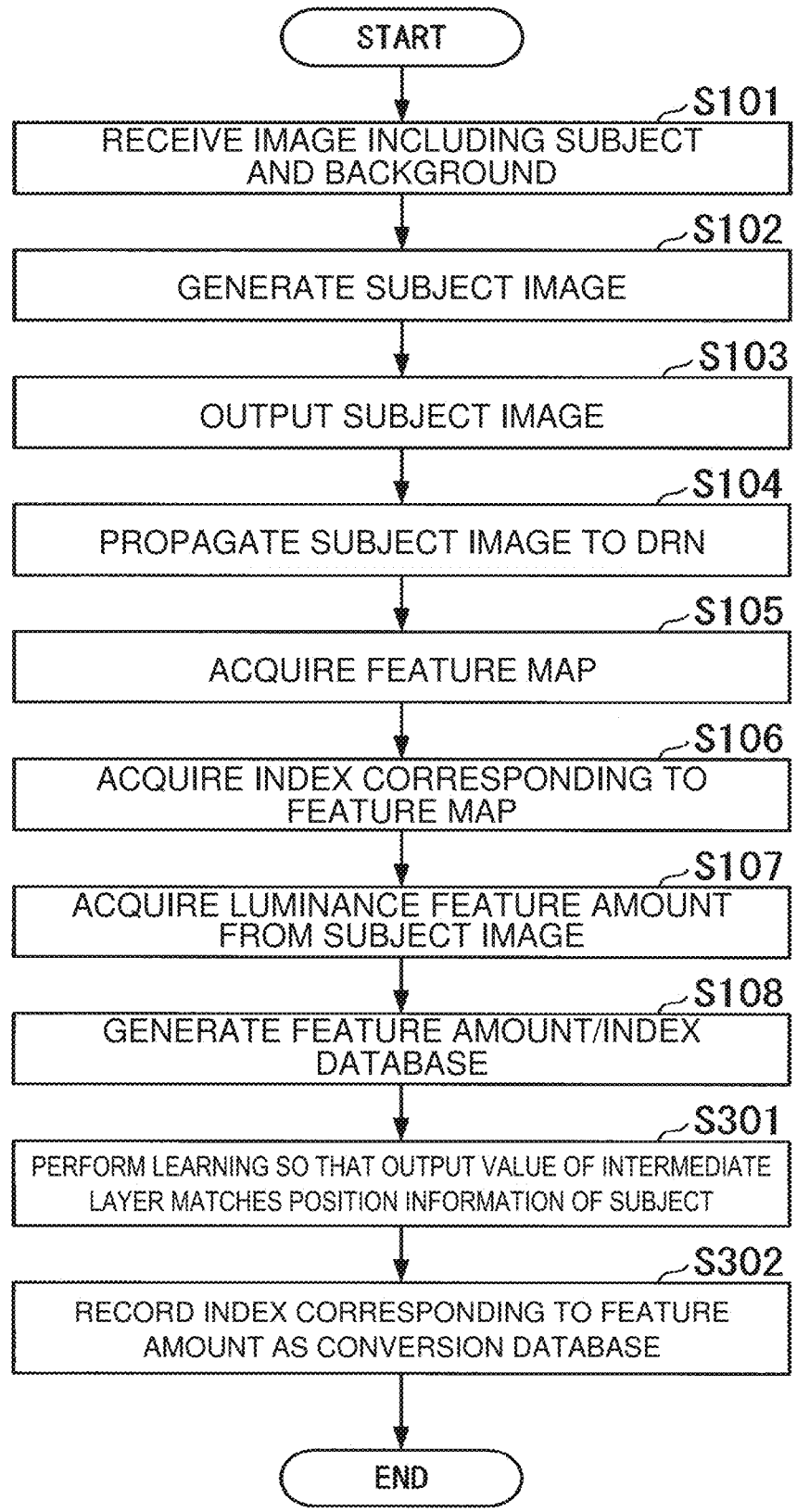
FIG. 7 is a flowchart showing the flow of a process for generating a database in the second embodiment.

FIG. 7 is a flowchart showing the flow of a process for generating a database in the second embodiment. In the second embodiment, a process for generating the conversion database is added in addition to the feature amount/index database. Note that steps S101 to S108 are the same as in the first embodiment, so the description is omitted.

The machine learning unit 114 performs learning so that the output value of the intermediate layer of DRN matches the position information of the subject (step S301). The machine learning unit 114 records the conversion data generated by learning as the conversion database (step S302).

Figure 8:
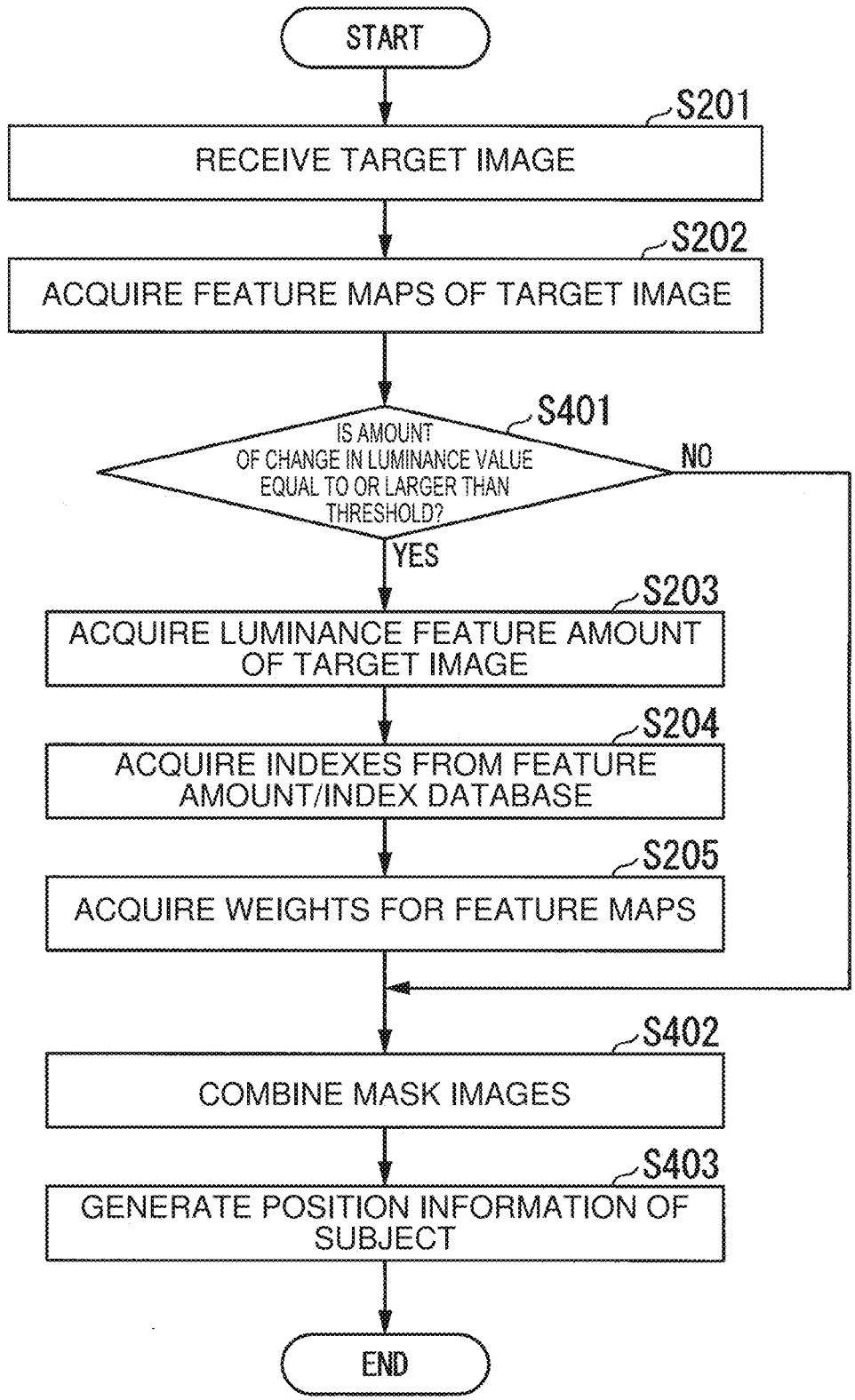
FIG. 8 is a flowchart showing the flow of a process for determining the position of a subject in the second embodiment.

FIG. 8 is a flowchart showing the flow of a process for determining the position of the subject in the second embodiment. Note that steps S201 to S205 are the same as in the first embodiment, so the description is omitted.

The feature amount candidate determination unit 116 determines whether the difference value between the luminance values is equal to or larger than the threshold (step S401). If the difference value between the luminance values is equal to or larger than the threshold (step S401: YES), the process proceeds to step S203. If the difference value between the luminance values is less than the threshold (step S401: NO), the process proceeds to step S402.

The mask combination unit 112a combines mask images according to the determination result of the feature amount candidate determination unit 116 (step S402). When the difference value between the luminance values is equal to or larger than the threshold, the mask combination unit 112a combines the mask images based on the acquired indexes of the intermediate layer and the weights for the indexes to generate a combined mask image. When the difference value between the luminance values is less than the threshold, the mask combination unit 112a converts the mask image based on the conversion data to generate a combined mask image. The subject position determination unit 113 generates position information indicating the position of the subject based on the generated combined mask image (step S403).

In the thus-configured position determination apparatus 100a, the machine learning unit 114 performs learning so that the output value of the intermediate layer of DRN matches the position information of the subject to generate the conversion database. Next, the feature amount candidate determination unit 116 of the position determination apparatus 100a determines which of the luminance feature amount and the conversion data is used to generate a mask image based on the difference value between the luminance values. The mask combination unit 112a generates a combined mask image based on the determination by the feature amount candidate determination unit 116. The subject position determination unit 113 can determine the position of the subject in the image by performing position determination on the generated combined mask image. When identifying the indexes and weighting the masks using the value of the luminance feature amount, the thus-configured position determination apparatus 100a can generate a mask image indicating the position of the subject even for an image for which sufficient accuracy cannot be obtained.

The position determination apparatus 100 in the above-described embodiment may be implemented by a computer. In that case, it may be realized by recording a program for implementing this function on a computer-readable recording medium, and causing a computer system to read and execute the program recorded on this recording medium. Note that the "computer system" here is intended to include an OS and hardware such as peripherals. In addition, the "computer-readable recording medium" refers to a portable medium such as a flexible disk, a magneto-optical disk, a ROM, and a CD-ROM, or a storage apparatus such as a hard disk built in the computer system. Furthermore, the "computer-readable recording medium" may include something that dynamically holds the program for a short period of time such as a communication line in transmitting the program via a network such as the Internet or via a communication line such as a telephone line, and something that holds the program for a certain period of time such as a volatile memory within a computer system serving as a server or a client in that case. In addition, the above program may be for implementing a part of the functions described above, may further be able to implement the functions described above in combination with a program already recorded in the computer system, or may be implemented using a programmable logic device such as an FPGA (field programmable gate array).

Although the embodiments of the present invention have been described above in detail with reference to the drawings, the specific configuration is not limited to these embodiments, and includes a design and the like within a range not deviating from the gist of the present invention.

INDUSTRIAL APPLICABILITY

The present invention is applicable to an apparatus for detecting the position of a subject included in a captured image.

REFERENCE SIGNS LIST

100 Position determination apparatus
101 First image input unit
102 Control unit
103 Subject/background separation unit
104 Feature map acquisition unit
105 First image feature amount acquisition unit
106 Database generation unit
107 Database storage unit
108 Second image input unit
109 Mask image generation unit
110 Second image feature amount acquisition unit
111 Corresponding mask search unit
112 Mask combination unit
113 Subject position determination unit
100a Position determination apparatus
114 Machine learning unit
115 Conversion database storage unit
116 Feature amount candidate determination unit
102a Control unit
112a Mask combination unit

The invention claimed is:

1. A position determination apparatus for determining, from a first image that is an image including at least a desired first subject, a position of the desired first subject, the position determination apparatus comprising:
a processor;
a storage medium having computer program instructions stored thereon, when executed by the processor, perform to:
acquire a first feature amount representing a predetermined feature of the first image; and
determines the position of the desired first subject using an estimated first feature map, where an estimation unit in which a second feature amount representing the predetermined feature obtained from a second image including a second subject is associated with a selected feature map that is a feature map corresponding to the second subject among a plurality of feature maps that are a set of feature maps that are maps representing features of the second image; and the estimated first feature map is estimated by the estimation unit to be associated with the first feature amount.

2. The position determination apparatus according to claim 1, wherein
a feature map included in the plurality of feature maps representing the features of the second image is an output obtained by performing a first convolution process on the second image, or an output obtained by further performing a second convolution process on the output obtained by performing the convolution process.

3. The position determination apparatus according to claim 2, wherein:
the first convolution process and the second convolution process are performed in intermediate layers of a learned neural network; and
the feature map included in the plurality of feature maps is an output value of the intermediate layers.

4. The position determination apparatus according to claim 3, wherein the selected feature map is a feature map that reacts more strongly to an area including the second subject than an area other than the second subject in the second image.

5. A position determination method for determining, from a first image that is an image including at least a desired first subject, a position of the desired first subject, the position determination method comprising:
a feature amount acquisition step of acquiring a first feature amount representing a predetermined feature of the first image;
an estimation step in which a second feature amount representing the predetermined feature obtained from a second image including a second subject is associated with a selected feature map that is a feature map corresponding to the second subject among a plurality of feature maps that are a set of maps representing features of the second image; and
a position determination step of determining the position of the desired first subject from the first image using an estimated first feature map that is estimated in the estimation step to be associated with the first feature amount.

6. A non-transitory computer readable medium including instructions executable by one or more processors to:
acquiring a first feature amount representing a predetermined feature of the first image; and determine the position of the desired first subject from the first image using an estimated first feature map that is estimated in an estimation step to be associated with the first feature amount, where the estimation step in which a second feature amount representing the predetermined feature obtained from a second image including a second subject is associated with a selected feature map that is a feature map corresponding to the second subject among a plurality of feature maps that are a set of maps representing features of the second image; and a position determination step of.

\* \* \* \* \*